United States Patent [19]

Miwa et al.

[11] Patent Number: 6,162,750
[45] Date of Patent: Dec. 19, 2000

[54] SUBSTRATE GLASS AND PLASMA DISPLAY MADE BY USING THE SAME

[75] Inventors: Yoshiharu Miwa, Oumihachiman; Junzo Wakaki; Kazuhiko Asahi, both of Moriyama, all of Japan

[73] Assignee: Nippon Electric Glass Co., Ltd., Otsu, Japan

[21] Appl. No.: 09/043,248

[22] PCT Filed: Jul. 10, 1996

[86] PCT No.: PCT/JP96/01916

§ 371 Date: Mar. 4, 1998

§ 102(e) Date: Mar. 4, 1998

[87] PCT Pub. No.: WO98/01399

PCT Pub. Date: Jan. 15, 1998

[30] Foreign Application Priority Data

Apr. 14, 1995 [JP] Japan ..................... 7-113835

[51] Int. Cl.[7] ............. C03C 3/085; C03C 3/087
[52] U.S. Cl. ............. 501/69; 501/68; 501/70; 345/60; 313/485
[58] Field of Search ............. 501/68, 69, 70; 313/485, 582, 493, 513, 564; 345/60; 315/169.4

[56] References Cited

U.S. PATENT DOCUMENTS

| | | | |
|---|---|---|---|
| 3,900,758 | 8/1975 | Andoh et al. | 313/518 |
| 4,337,410 | 6/1982 | Van Der Geer et al. | 501/70 |
| 4,390,637 | 6/1983 | Daiku | 501/64 |
| 4,562,161 | 12/1985 | Mennemann et al. | 501/67 |
| 5,270,269 | 12/1993 | Hares et al. | 501/70 |
| 5,468,693 | 11/1995 | Comte | 501/69 |
| 5,599,754 | 2/1997 | Maeda et al. | 501/69 |
| 5,776,844 | 7/1998 | Koch et al. | 501/70 |
| 5,780,371 | 7/1998 | Rifqi et al. | 501/70 |
| 5,858,897 | 1/1999 | Maeda et al. | 501/70 |
| 5,900,296 | 5/1999 | Hayashi et al. | 501/70 |

FOREIGN PATENT DOCUMENTS 3-40933  2/1991  Japan .

*Primary Examiner*—Michael Marcheschi
*Attorney, Agent, or Firm*—Collard & Roe. P.C.

[57] ABSTRACT

A plasma display unit comprises a pair of substrate glasses, discharge electrodes formed on inner surfaces of the substrate glasses, and a fluorescent member disposed between the substrate glasses for emitting light in response to the discharge of the electrode. Each substrate glass used in the plasma display unit essentially consists by weight of 50–65% $SiO_2$, 2–15% $Al_2O_3$, 0–4% MgO, 0–2.9% CaO, 2–13% SrO, 0.5–13% BaO, 10–27% MgO+CaO+SrO+BaO, 0–1% $Li_2O$, 2–10% $Na_2O$, 2–13% $K_2O$, 7–15% $Li_2+Na_2O+K_2O$, 1–9% $ZrO_2$, 0–5% $TiO_2$, 0–1% $Sb_2O_3$, and 0–1% $As_2O_3$. The substrate glass exhibits small thermal contraction even if subjected to heat treatment at a temperature of 570° C. or more, has a coefficient of thermal expansion of 75–95×10$^{-7}$/° C., and is high in volume resistivity and excellent in chemical durability as compared with a soda lime glass.

2 Claims, 1 Drawing Sheet

SUBSTRATE GLASS AND PLASMA DISPLAY MADE BY USING THE SAME

TECHNICAL FIELD

This invention relates to a substrate glass and, in particular, to a substrate glass suitable as a substrate material for a plasma display panel and a plasma display unit using the glass.

BACKGROUND TECHNIQUE

Traditionally, a soda lime glass plate for a building window has been used as a substrate for a plasma display panel. On a surface of the substrate, an electrode comprising Al, Ni, Ag, ITO, a NESA film, or the like and an insulating paste are printed at a temperature of 500–600° C. to thereby form a circuit. Then, frit sealing is carried out at a temperature of 500–600° C. In this manner, the plasma display panel is manufactured.

Therefore, the substrate glass of the type is generally required to have following characteristics.

① A strain point is equal to or greater than 570° C. in order to reduce thermal contraction upon heat treatment at a temperature of 500–600° C., in particular, 570° C. or more.

② No warp occurs because a coefficient of thermal expansion matches those of the insulating paste and sealing frit. In other words, the coefficient of thermal expansion is $75$–$95 \times 10^{-7}/°C$.

③ A volume resistivity of the glass is as high as $10^{10} \Omega \cdot cm$ or more at 150° C. and an alkali component does not react with a thin-film electrode. This is because, if the alkali component in the glass reacts with the thin-film electrode such as the NESA film, an electric resistance of an electrode material changes.

The soda lime glass for a building window has the coefficient of thermal expansion of about $89 \times 10^{-7}/°C$. and no warp occurs if it is used as the substrate of the plasma display panel. However, because the strain point is as low as about 500° C., there is disadvantage that the thermal contraction is great upon the heat treatment at a temperature of 570–600° C.

In addition, the soda lime glass is relatively low in volume resistivity and poor in chemical durability. During the storage or the use over a long period of time, hazing occurs on a surface. This results in a disadvantage that a display screen of the plasma display unit can not be clearly seen.

Taking the above-mentioned situation into consideration, it is an object of the present invention to provide a substrate glass which exhibits little thermal contraction even if heat treatment is carried out at a temperature of 570° C. or more, which has a coefficient of thermal expansion of $75$–$95 \times 10^{-7}/°C$., and which is high in volume resistivity and excellent in chemical durability as compared with a soda lime glass.

It is another object of the present invention to provide a plasma display unit using the above-mentioned substrate glass.

DISCLOSURE OF THE INVENTION

A substrate glass according to the present invention is characterized by essentially consisting by weight of 50–65% $SiO_2$, 2–15% $Al_2O_3$, 0–4% MgO, 0–2.9% CaO, 2–13% SrO, 0.5–13% BaO, 10–27% MgO+CaO+SrO+BaO, 0–1% $Li_2O$, 2–10% $Na_2O$, 2–13% $K_2O$, 7–15% $Li_2+Na_2O+K_2O$, 1–9% $ZrO_2$, 0–5% $TiO_2$, 0–1% $Sb_2O_3$, and 0–1% $As_2O_3$.

Preferably, the glass is characterized by essentially consisting by weight of 51–64% $SiO_2$, 3–14% $Al_2O_3$, 0–3.5% MgO, 0–2.8% CaO, 3–12% SrO, 0.5–12% BaO, 10–27% MgO+CaO+SrO+BaO, 0–1% $Li_2O$, 2.5–9% $Na_2O$, 3–12% $K_2O$, 7–15% $Li_2O+Na_2O+K_2O$, 1.5–8% $ZrO_2$, 0.1–4% $TiO_2$, 0–1% $Sb_2O_3$, and 0–1% $As_2O_3$.

A plasma display unit according to the present invention comprises a pair of substrate glasses, discharge electrodes formed on inner surfaces of the substrate glasses, and a fluorescent member disposed between the substrate glasses to emit light in response to the discharge of the electrode, and is characterized in that each of the substrate glasses essentially consists by weight of 50–65% $SiO_2$, 2–15% $Al_2O_3$, 0–4% MgO, 0–2.9% CaO, 2–13% SrO, 0.5–13% BaO, 10–27% MgO+CaO+SrO+BaO, 0–1% $Li_2O$, 2–10% $Na_2O$, 2–13% $K_2O$, 7–15% $Li_2O+Na_2O+K_2O$, 1–9% $ZrO_2$, 0–5% $TiO_2$, 0–1% $Sb_2O_3$, and 0–1% $As_2O_3$.

Preferably, in the above-mentioned plasma display unit, the substrate glass essentially consists by weight of 51–64% $SiO_2$, 3–14% $Al_2O_3$, 0–3.5% MgO, 0–2.8% CaO, 3–12% SrO, 0.5–12% BaO, 10–27% MgO+CaO+SrO+BaO, 0–1% $Li_2O$, 2.5–9% $Na_2O$, 3–12% $K_2O$, 7–15% $Li_2O+Na_2O+K_2O$, 1.5–8% $ZrO_2$, 0.1–4% $TiO_2$, 0–1% $Sb_2O_3$, and 0–1% $As_2O_3$.

Figure 1:
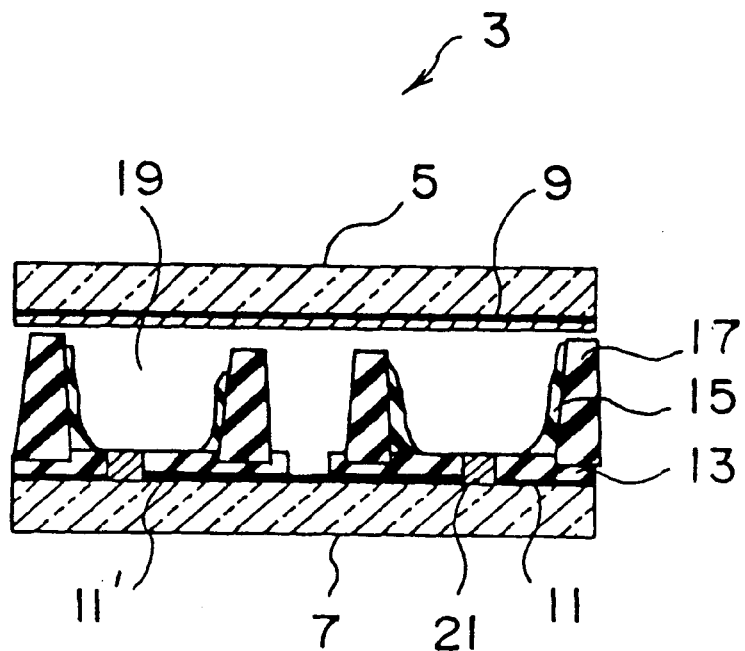
FIG. 1 is a sectional view of a part of a DC type plasma display panel using a substrate glass according to the present invention.

BEST MODE OF EMBODYING THE INVENTION:

Referring to FIG. 1, a plasma display panel 3 of a DC type has a front plate glass 5 and a rear plate glass 7 arranged opposite to each other at a predetermined distance. A substrate glass corresponds to each of the front plate glass 5 and the rear plate glass 7.

The front plate glass 5 is provided with a cathode 9 formed on its inner surface. On the other hand, an inner surface of the rear plate glass 7 is provided with an anode 11 and a subsidiary anode 11' formed thereon and ribs 17 having fluorescent members 15 and standing therefrom through an insulator 13. A He-Xe gas 19 is filled in an inner space surrounded by the front plate glass 5 and the rear plate glass 7. In the figure, 21 represents a resistor.

Figure 2:
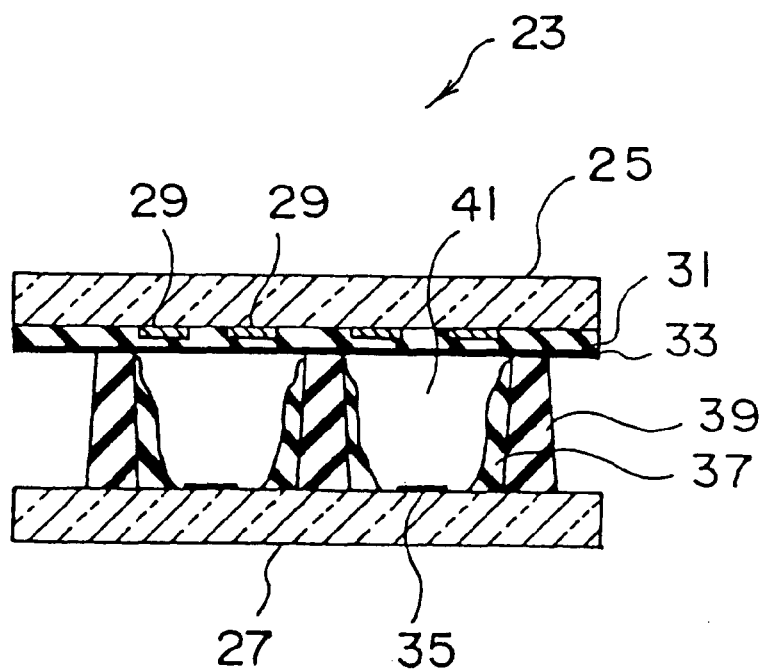
FIG. 2 is a sectional view of a part of an AC type plasma display panel using a substrate glass according to the present invention.

On the other hand, referring to FIG. 2, a plasma display panel 23 of an AC type has a front plate glass 25 and a rear plate glass 27 arranged opposite to each other at a predetermined distance. The substrate glass corresponds to each of the front plate glass 25 and the rear plate glass 27. The front plate glass 25 has display electrodes 29 formed on its inner surface. The display electrodes 29 are buried in a dielectric layer 31. On a surface of the dielectric layer 31, a MgO film 33 is formed. Address electrodes 35 are formed on an inner surface of the rear plate glass 27. Between the MgO film 33 on the inner surface of the front plate glass 25 and the inner surface of the rear plate glass 27, ribs 39 stand upward from the rear plate glass 27. Each rib 39 has a fluorescent member 37 formed on its surface. An inner space surrounded by the front plate glass 25 and the rear plate glass 27 is filled with a Ne-Xe gas 41.

Next, description will be made about the reason why each component of the glass for substrate according to the present invention is limited as mentioned above.

SiO$_2$ is a network former of the glass and has a content of 50–65%, preferably, 51–64%. When the content is less than 50%, the glass has a low strain point and exhibits large thermal contraction. On the other hand, when the content is more than 65%, a coefficient of thermal expansion becomes excessively low.

Al$_2$O$_3$ is a component for raising the strain point of the glass, and has a content of 2–15%, preferably, 3–14%. When the content is less than 2%, the above-mentioned effect can not be obtained. On the other hand, when the content is more than 15%, the coefficient of thermal expansion becomes excessively low.

MgO is a component for enhancing meltability of the glass and controlling the coefficient of thermal expansion, and has a content of 0–4%, preferably, 0–3.5%. When the content is more than 4%, the glass is readily devitrified and is difficult to shape. Specifically, if the glass is readily devitrified, a melting temperature must be raised in order to suppress occurrence of devitrified substances. When the melting temperature is raised, the glass is softened during shaping. This often results in occurrence of waviness on a surface of a glass plate and decrease in dimensional accuracy. It is therefore impossible to use the glass plate as a substrate of the plasma display panel which is required to have high surface accuracy and high dimensional accuracy.

Each of CaO, SrO, and BaO is a component similar in function to MgO. The content of CaO is 0–2.9%, preferably, 0–2.8%. When the content is more than 2.9%, the glass is readily devitrified and degraded in formability.

On the other hand, the contents of SrO and BaO are 2–13% and 0.5–13%, preferably, 3–12% and 0.5–12%, respectively. When the content of SrO is less than 2% or when the content of BaO is less than 0.5%, the strain point becomes excessively low. On the other hand, when each content is more than 13%, the glass is readily devitrified and is difficult to shape.

It is noted here that when the total amount of MgO, CaO, SrO and BaO is less than 10%, the coefficient of thermal expansion tends to become small. On the other hand, when the total amount is more than 27%, the glass is readily devitrified.

Each of Li$_2$O, Na$_2$O, and K$_2$O is a component for controlling the coefficient of thermal expansion. The content of Li$_2$O is 0–1%. When the content of Li$_2$O is more than 1%, the strain point becomes excessively low.

On the other hand, the content of Na$_2$O is 2–10%, preferably, 2.5–9%. When the content is less than 2%, the coefficient of thermal expansion becomes excessively small. On the other hand, when the content is more than 10%, the strain point becomes excessively low.

The content of K$_2$O is 2–13%, preferably, 3–12%. When the content is less than 2%, the coefficient of thermal expansion becomes excessively small. On the other hand, when the content is more than 13%, the strain point becomes excessively low.

It is noted here that when the total amount of Li$_2$O, Na$_2$O, and K$_2$O is less than 7%, the coefficient of thermal expansion tends to become small. On the other hand, when the total amount is more than 15%, the strain point tends to become low.

ZrO$_2$ is a component having an effect of improving chemical durability of the glass and has a content of 1–9%, preferably, 1.5–8%. When the content is less than 1%, the effect of improving the chemical durability becomes poor and the strain point becomes excessively low. On the other hand, when the content is more than 9%, the coefficient of thermal expansion becomes excessively small and devitrified substances are readily produced during a melting process of the glass, resulting in difficulty in shaping.

TiO$_2$ is a component for protecting the glass from coloration by ultraviolet ray, and has a content of 0–5%, preferably, 0.1–4%. In the plasma display unit, the ultraviolet ray is produced during the discharge. When the substrate is colored by the ultraviolet ray, the display screen gradually becomes unclear during the use for a long period of time. Accordingly, in the present invention, it is desirable that 0.1% or more TiO$_2$ is contained. However, the content of more than 5% is not preferable because the glass is readily devitrified and the shaping is difficult.

Each of Sb$_2$O$_3$ and As$_2$O$_3$ is a component used as a fining agent and has a content of 0–1%. When the content is more than 1%, the glass is readily devitrified and is difficult to shape.

EXAMPLE

Now, the substrate glass of the present invention will be described in conjunction with specific examples.

Table 1 shows the substrate glasses (samples Nos. 1 to 7) according to the present invention and the substrate glasses (samples Nos. 8 and 9) as comparative examples. It is noted here that the sample No. 9 is a typical soda lime glass for a building window.

Each of the samples shown in Table 1 was prepared in the following manner.

At first, each glass batch was prepared to have each composition specified in the Table. The glass batch was put in a platinum crucible and then melted in an electric furnace at a temperature of 1450–1550° C. for 4 hours to obtain a molten glass. The molten glass was poured onto carbon and shaped into a plate. Next, both surfaces of the glass plate were optically polished to manufacture a glass substrate.

Each sample obtained in the above-mentioned manner was examined for the strain point, the liquid phase temperature, the coefficient of thermal expansion, the volume resistivity, and the degree of coloration by the ultraviolet ray.

As is obvious from Table 1, each of the samples Nos. 1–7 according to the present invention has the strain point of 572° C. or more so that the thermal contraction is small. The liquid phase temperature is 1050° C. or less so that the devitrification is difficult. Furthermore, each of these samples has the coefficient of thermal expansion of 80–89× $10^{-7}$/° C., the volume resistivity of $10^{11.4}$ or more at 150° C., and the small degree of coloration by the ultraviolet ray.

On the other hand, the sample No. 8 as the comparative example has the liquid phase temperature as high as 1200° C. and is therefore easy in devitrification and difficult to shape. The sample No. 9 has the strain point as low as 500° C. and the low volume resistivity. It is therefore supposed that an alkali component tends to react with a thin-film electrode. In addition, the degree of coloration by the ultraviolet ray was high.

TABLE 1

| Sample No. | This Invention | | | | | | | Comparative Example (wt %) | |
|---|---|---|---|---|---|---|---|---|---|
| Composition | 1 | 2 | 3 | 4 | 5 | 6 | 7 | 8 | 9 |
| $SiO_2$ | 57.2 | 63.3 | 56.4 | 56.9 | 56.3 | 55.9 | 59.8 | 61.8 | 73.0 |
| $Al_2O_3$ | 9.0 | 6.0 | 11.0 | 7.0 | 8.0 | 8.0 | 7.0 | 6.0 | 2.0 |
| MgO | 2.0 | 1.0 | 1.0 | 1.5 | 2.0 | 2.5 | 2.0 | 2.0 | 4.0 |
| CaO | 2.0 | 1.0 | 2.0 | 2.0 | 2.0 | 2.5 | 2.0 | 4.0 | 7.0 |
| SrO | 7.0 | 9.0 | 4.0 | 7.0 | 6.5 | 5.5 | 9.0 | 6.0 | — |
| BaO | 9.0 | 6.0 | 10.0 | 8.5 | 9.0 | 8.5 | 1.5 | 6.0 | — |
| $Li_2O$ | — | — | 0.2 | — | — | 0.5 | — | — | — |
| $Na_2O$ | 4.0 | 3.0 | 7.0 | 4.5 | 4.3 | 2.5 | 5.5 | 4.0 | 13.0 |
| $K_2O$ | 5.0 | 6.0 | 4.0 | 7.0 | 6.8 | 8.0 | 8.0 | 5.0 | 1.0 |
| $ZrO_2$ | 4.0 | 3.0 | 2.0 | 4.5 | 4.2 | 5.0 | 4.5 | 4.0 | — |
| $TiO_2$ | 0.5 | 1.5 | 2.0 | 0.7 | 0.5 | 0.2 | 0.5 | 1.0 | — |
| $Sb_2O_3$ | 0.3 | — | 0.2 | 0.4 | 0.4 | 0.6 | 0.2 | 0.2 | — |
| $As_2O_3$ | — | 0.2 | 0.2 | — | — | 0.3 | — | — | — |
| Strain Point (° C.) | 600 | 595 | 582 | 587 | 584 | 572 | 576 | 590 | 500 |
| Liquid Phase Temperature (° C.) | 1000 | 980 | 1050 | 1030 | 970 | 1050 | 1020 | 1200 | 940 |
| Coefficient of Thermal Expansion ($\times 10^{-7}$/° C.) [30–380° C.] | 81 | 83 | 88 | 82 | 80 | 89 | 82 | 83 | 89 |
| Volume Resistivity ($\Omega \cdot cm$) [$\log \rho$ 150° C.] | 12.5 | 12.8 | 11.4 | 11.9 | 11.7 | 13.2 | 11.4 | 12.6 | 8.5 |
| Degree of Coloration by Ultraviolet Ray (%) [Δ T400] | 6 | 4 | 3 | 5 | 6 | 7 | 3 | 5 | 12 |

The strain point in the Table was measured in accordance with the ASTM C336-71 method. The liquid phase temperatures was obtained by observing devitrification after putting glass powder having a particle size of 297–500 μm into a platinum boat and holding the platinum boat in a thermal gradient furnace for 48 hours.

As regards the coefficient of thermal expansion, the mean coefficient of thermal expansion at 30–380° C. was measured by a dilatometer. The volume resistivity was measured as values at 150° C. in accordance with the ASTM C657-78 method.

Furthermore, with respect to the degree of coloration by the ultraviolet ray, each glass substrate was irradiated for 48 hours by a mercury lamp of 400 W, and the difference before and after the irradiation in the light transmittance measured for the ultraviolet ray of a wavelength of 400 nm was obtained. The difference having a greater value indicates easier coloration by the ultraviolet ray.

As described above, the glass for substrate according to the present invention exhibits small thermal contraction even if subjected to the heat treatment at 570° C. or more, has the coefficient of thermal expansion of 75–95×10$^{-7}$/° C., is high in volume resistivity, is excellent in chemical durability, and is little in coloration by the ultraviolet ray. Therefore, the glass is suitable as a substrate material for the plasma display panel.

Furthermore, the substrate glass according to the present invention is hardly devitrified and can be manufactured by any one of a float process, a fusion process, and a roll-out process which are generally known as a shaping method of the glass plate.

Industrial Applicability

As described above, the substrate glass according to the present invention is suitable as the substrate material for the plasma display panel.

What is claimed is:

1. A plasma display unit comprising a pair of substrate glasses, discharge electrodes formed on inner surfaces of said substrate glasses, and a fluorescent member disposed between said substrate glasses for emitting light in response to the discharge of said electrodes, wherein each of said substrate glasses consists essentially of, by weight, 50–65% $SiO_2$, 2–15% $Al_2O_3$, 0–3.5% MgO, 0–2.9% CaO, 2–13% SrO, 6–10% BaO, 10–27% MgO+CaO+SrO+BaO, 0–1% $Li_2O$, 2–10% $Na_2O$, 2–13% $K_2O$, 7–15% $Li_2O+Na_2O+K_2O$, 1–9% $ZrO_2$, 0–5% $TiO_2$, 0–1% $Sb_2O_3$, and 0–1% $As_2O_3$, each of said substrate glasses having a strain point of at least 570° C., a coefficient of thermal expansion of 75 to 95×10$^{-7}$/° C., and a volume resistivity of at least 10$^{10}$ Ω cm at 150° C., and a liquids temperature of 1050° C. or less.

2. A plasma display unit as claimed in claim 1, wherein said substrate glass consists essentially of, by weight, 51–64% $SiO_2$, 3–14% $Al_2O_3$, 0–3.5% MgO, 0–2.8% CaO, 3–12% SrO, 6–10% BaO, 10–27% MgO+CaO+SrO+BaO, 0–1% $Li_2O$, 2.5–9% $Na_2O$, 3–12% $K_2O$, 7–15% $Li_2O+Na_2O+K_2O$, 1.5–8% $ZrO_2$, 0.1–4% $TiO_2$, 0–1% $Sb_2O_3$, and 0–1% $As_2O_3$.

\* \* \* \* \*